United States Patent
Spindler et al.

(10) Patent No.: US 8,036,329 B2
(45) Date of Patent: Oct. 11, 2011

(54) SYCHRONIZATION DURING ANTI-COLLISION

(75) Inventors: Robert Spindler, Graz (AT); Christian Scherabon, Graz (AT); Roland Brandl, Graz (AT)

(73) Assignee: NXP B.V., Eindhoven (NL)

(*) Notice: Subject to any disclaimer, the term of this patent is extended or adjusted under 35 U.S.C. 154(b) by 819 days.

(21) Appl. No.: 10/583,077

(22) PCT Filed: Dec. 9, 2004

(86) PCT No.: PCT/IB2004/052726
§ 371 (c)(1),
(2), (4) Date: Jun. 15, 2006

(87) PCT Pub. No.: WO2005/062519
PCT Pub. Date: Jul. 7, 2005

(65) Prior Publication Data
US 2007/0164850 A1    Jul. 19, 2007

(30) Foreign Application Priority Data
Dec. 19, 2003 (EP) .................................. 03104849

(51) Int. Cl.
*H04L 7/00* (2006.01)
(52) U.S. Cl. ......... 375/354; 340/10.1; 340/825; 340/3.2
(58) Field of Classification Search .................. 375/140, 375/141, 145, 240.26, 240.28, 149, 147, 375/146, 293, 370, 369; 340/870.14, 681, 340/3.2, 825.2, 825.14, 10.2, 10.1; 455/502
See application file for complete search history.

(56) References Cited

U.S. PATENT DOCUMENTS

| | | | | |
|---|---|---|---|---|
| 4,471,345 A | * | 9/1984 | Barrett, Jr. | 340/572.1 |
| 4,811,340 A | * | 3/1989 | McEachern et al. | 370/505 |
| 5,134,481 A | * | 7/1992 | Gornati et al. | 348/558 |
| 5,539,394 A | * | 7/1996 | Cato et al. | 340/10.32 |
| 5,541,954 A | * | 7/1996 | Emi | 375/133 |
| 5,557,280 A | * | 9/1996 | Marsh et al. | 342/44 |
| 5,663,715 A | * | 9/1997 | Godoroia | 340/825.2 |
| 5,686,902 A | * | 11/1997 | Reis et al. | 340/10.2 |
| 5,774,810 A | * | 6/1998 | Sugi | 455/502 |
| 5,940,006 A | * | 8/1999 | MacLellan et al. | 340/10.1 |
| 6,122,323 A | * | 9/2000 | Johnson | 375/259 |

(Continued)

FOREIGN PATENT DOCUMENTS
WO   WO 99/60510   * 11/1999

*Primary Examiner* — Chieh M Fan
*Assistant Examiner* — Santiago Garcia (57) ABSTRACT

An RFID system comprises at least one reading device (1) and at least one transponder (2, 2', 2", 2'''), which are configured for non-contact communication by means of modulated electromagnetic signals (SS), which contain data and/or commands packed in data frames, in which the reading device (1) is configured for transmitting a group of data frames (D-SYNC), which contain synchronization information (Preamble, Start Delimiter) for synchronization with the transponder (2, 2', 2", 2''') and to transmit another group of data frames (D-NOSYNC) which do not contain such synchronization information, in which the transponder (2, 2', 2", 2''') has synchronization means (14, 20, 21) which are configured to effect synchronization with the reading device (1) with the help of synchronization information (Preamble, Start Delimiter) contained in received data frames (D-SYNC) and synchronization status test means (15,15',15",22) configured for detecting whether the transponder runs synchronously with the reading device and in the event of it not running synchronously, to switch on the synchronization unit (14, 20, 21).

26 Claims, 6 Drawing Sheets

U.S. PATENT DOCUMENTS

| | | | |
|---|---|---|---|
| 6,265,962 B1* | 7/2001 | Black et al. | 340/10.2 |
| 6,267,105 B1* | 7/2001 | Bertossi | 123/525 |
| 6,577,232 B1* | 6/2003 | Hawkinson et al. | 340/505 |
| 6,754,150 B1* | 6/2004 | Usui | 369/47.33 |
| 6,774,766 B1* | 8/2004 | Moyer | 340/10.32 |
| 7,133,432 B2* | 11/2006 | Kuffner et al. | 375/137 |
| 7,372,365 B2* | 5/2008 | Jackson | 340/572.1 |
| 7,497,384 B2* | 3/2009 | Powell et al. | 235/492 |
| 2001/0022809 A1* | 9/2001 | Yamashita | 375/149 |
| 2002/0034214 A1* | 3/2002 | Okada et al. | 375/147 |
| 2002/0177460 A1* | 11/2002 | Beasley et al. | 455/502 |
| 2003/0003942 A1* | 1/2003 | Okumura | 455/522 |
| 2003/0066009 A1* | 4/2003 | Obuchi et al. | 714/752 |
| 2003/0091018 A1* | 5/2003 | Oliver et al. | 370/342 |
| 2004/0142727 A1* | 7/2004 | Tari et al. | 455/561 |
| 2004/0268132 A1* | 12/2004 | Waris | 713/185 |
| 2005/0093679 A1* | 5/2005 | Zai et al. | 340/10.2 |
| 2005/0212673 A1* | 9/2005 | Forster | 340/572.7 |
| 2006/0164212 A1* | 7/2006 | Roz et al. | 340/10.2 |
| 2007/0030126 A1* | 2/2007 | Friedrich | 340/10.2 |
| 2007/0116292 A1* | 5/2007 | Kurita et al. | 380/270 |
| 2009/0058599 A1* | 3/2009 | Calvarese | 340/10.1 |

* cited by examiner

Fig. 1

| Command | Counter 0 | Counter 1 | Counter 2 |
|---|---|---|---|
| Group Select XX | 1 3 5 <br> 2 4 | | |
| Fail | 2 | 1 4 <br> 3 5 | |
| Success | 1 4 <br> 3 5 | | |
| Fail | 3 4 | 1 5 | |
| Fail | 4 | 3 5 | 1 |
| Success | 3 5 | 1 | |
| Fail | 5 | 3 | 1 |
| Success | 3 | 1 | |
| Success | 1 | | |
| Success | Reply | | |

SYCHRONIZATION DURING ANTI-COLLISION

The invention relates to an RFID device for noncontact communication with other RFID devices of an RFID system my means of modulated electromagnetic signals, which contain data and/or commands packed in data frames.

The invention also relates to an RFID system, comprising at least one reading device and at least one transponder, which are configured for noncontact communication by means of modular electromagnetic signals, which contain data and/or commands packed in data frames.

The invention also relates to an anti-collision method for determining a number of transponders in a sphere of a reading device.

Such an RFID device, such an RFID system and such an anti-collision method have already been described in various norms and standards. With the exception of very simple RFID systems, in which transponders transmit automatically pre-stored data such as an identification number, as soon as they have sufficient supply of electrical energy through high-frequency signals of a reading device, the communication in the known RFID systems between reading devices and transponders, which are also designated as tags, takes place by the transmission of commands and data according to a number of different protocols. Differentiation is then basically made between RFID systems, in which the reading device as well as the transponder can initiate a communication process and such RFID systems, in which the transponder only responds if demanded by the reading device (Reader talks first). An example for the latter system is described in the ISO 18000 standard "Radio Frequency Identification (RFID) for Item Management", this standard defining parameters for transponders and reading devices, which are used in ERP and merchandizing.

Figure 1:
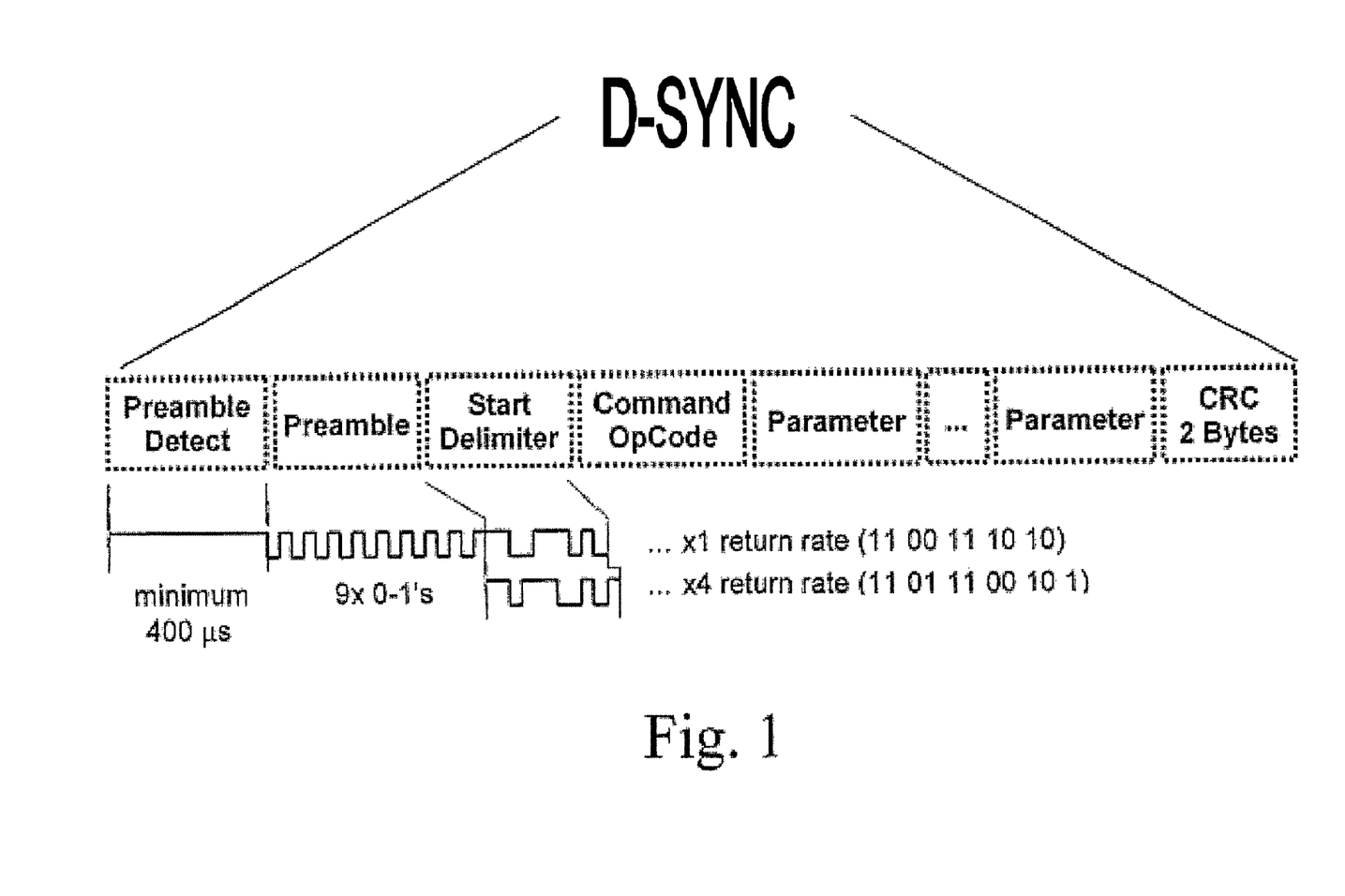
FIG. 1 shows in general a data frame conforming to the standard ISO 18000-6.

For all RFID systems, however, the reading device and transponder must mutually synchronize before communication routines, to ensure a reliable data transmission. This synchronization routine must be repeated at relatively short intervals, because the reading devices and transponders would be out of synchronization quickly without such synchronization routines due to the component tolerances present and communication would thus become impossible. In order to be able to carry out a synchronization routine at any time, the commands and data to be transmitted are to be packed in data frames, which provide the necessary information for synchronization of the respective distant end (i.e. reading device or transponder) through suitable data frame structures. This is further explained with the help of a data frame shown in FIG. 1. This data frame is proposed in Part 6 of the ISO 18000 standard which defines the parameters for the air interface communication in the UHF frequency band. According to this ISO 18000-6 standard, each command of a reading device to transponders is packed in a data frame, which contains the following components:

a) Preamble Detect: A time span of at least 400 μs in which no subscriber should transmit in the RFID system;
b) Preamble: A bit sample of nine 0-1 pairs, which defines the transmitting frequency (8-40 kbit/s).
c) Start Delimiter: One or several characteristic known bit samples: If this bit sample is received correctly, then the device to be synchronized knows that the synchronization routine was successful and now the actual payload can be received.
d) Command OpCode: The number of the actual command, one byte long.
e) Parameter: The command defined by the Command Opcode can contain one or several parameters, which are also transmitted.
f) CRC: A two-byte long checksum makes possible the checking at the receiving device whether the received data frame was received free of error.

Also the data frames by means of which the transponders transmit their replies to the reading device are built in a similar manner.

The disadvantageous ratio between the total length of the data frame and the length of the payload packed in it is a disadvantage to these known RFID-devices and RFID systems, in which each command transmitted in a data frame and data transmission routine triggers a synchronization routine at the remote station. This problem is intensified because there are inevitably collisions during data transmission in all RFID systems in which several transponders can communicate simultaneously with a reading device, with the consequence that the colliding data frames must be rejected and sent again or the communication must even be re-initialized. It will be understood that such collisions considerably reduce the data throughput rate. Basically, data collisions will always occur as long as a reading device does not know all the transponders present in its effective range of operation and cannot address each of them individually with their identification number. However, to be able to do this, the reading device must learn the unique user identification numbers of all transponders present in its range of operation at brief intervals; in other words, the reading device must every so often inventorize the transponders addressable by it. For this purpose, the reading device requests, at regular intervals, all the transponders present in its range of operation to register themselves by means of what are called Inventory Commands. The transponders respond either immediately or after a delay defined by pseudo-random generators. Even then the probability that several transponders respond at the same time is high, so that their transmission signals overlap each other, and as a result the reading device cannot receive correct data. An anti-collision method is provided to be able to circumvent this problem, which method ensures that the transponders register themselves individually with a reading device and impart their identification number at determined intervals. This anti-collision method is based on classifying the signal transmissions of the transponders into rounds and time slots, where a round consists of a number of time slots. The number of time slots per round i.e. the size of the round and the duration of the time slot are first preset, but can be adjusted by the reading device depending on the number of collisions and informed to the transponders. Each transponder randomly selects one of the available time slots on receiving an Inventory Command, in which it responds to the reading device. There are thus three possible results in each time slot on transmission of the inventory command:

1) The reading device does not receive any response, because either no transponder has selected the current time slot for its response, or the reading device cannot receive any transponder signal (because it is too weak or because no transponder is in its range of operation).

2) The reading device detects a collision between the responses of a plurality of transponders, which have selected the same time slot for their response, from a signal conflict or wrong checksums of the received data frames. The reading device rejects the received data frames in this case.

3) The reading device receives an error-free response from exactly one transponder. This response contains the unique identification number of the transponder. The reading device confirms to the transponder the correct reception of the data frame, upon which the transponder sends no further signals without being requested explicitly by the reading device to do so.

The round is continued, till all time slots have been run though and then a new round is begun. If no transponder registers in any time slot of a round, this means that all the transponders present in the range of operation of the reading device have been detected or there is no transponder in the range of operation of the reading device. A reading device can detect about 100 transponders per second by using RFID systems currently available on the market.

Figure 2:
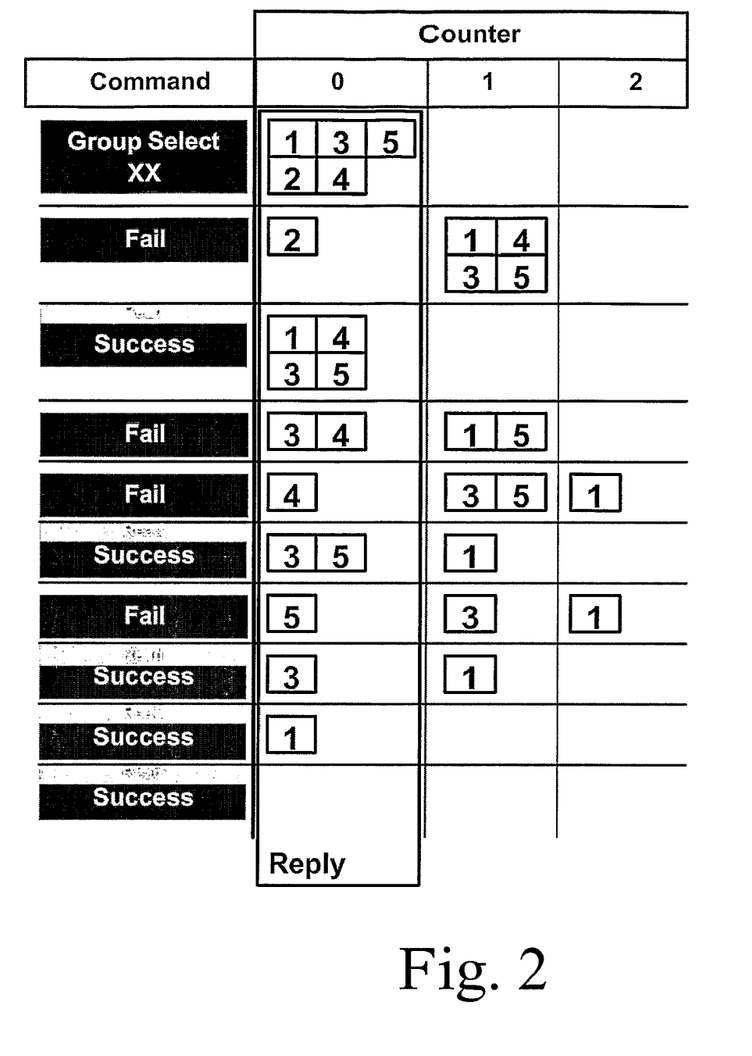
FIG. 2 shows schematically the run of an anti-collision method.

A typical routine of such an anti-collision method is illustrated schematically in FIG. 2 for five transponders and a round size of three time slots. Differently from the above exposition, this example shows the time slots as internal counts 0, 1, 2 of the transponders. Each of the five transponders selects one of three possible counts randomly on receiving an Inventory command, which is designated in this example (depending on the protocol) as Group Select XX. The count is decremented by 1 after each time slot has elapsed. When the counter level reaches 0, the transponder responds. As can be seen, if all the five transponders set the counter 0 on the Group Select XX command and respond, it must cause a data collision. The reading device recognizes this collision and thereupon transmits a Fail command (Repeat command) to all transponders, which initiates a new round and causes the transponders to select a new random count for this round. As can be seen, the transponder No. 2 selects the count 0 and the transponders Nos. 1, 3, 4, 5 select the count 1. The transponder No. 2 responds successfully to the reading device, which is acknowledged by the reading device with a Success command (Confirm command). The Success command causes, on one hand, the transponder No. 2 to go to a Rest mode, in which it sends no signals and, on the other hand, causes the other transponders (with a count different from 0) to decrement their counts, due to which they show the count 0 in the next time slot and all respond simultaneously, which again triggers a collision, which is acknowledged by the reading device by a Fail command, which causes the transponders to make a renewed random selection of their counts, where transponders No. 3 and 4 select the count 0 and the transponders Nos. 1 and 5 select the count 1, which naturally triggers a collision again, which is acknowledged by the reading device with a Fail command. In the next round, transponder No. 4 is the only transponder with count 0, so the reading device recognizes its response without error and acknowledges it with the Success command. The method is continued till all transponders have finally been recognized. Required in this example were in all a Group Select XX command, four Fail commands and five Success commands, till all transponders had been recognized by the reading device. If one observes the structure of a data frame represented in FIG. 3, in which frame the Success command is packed, one can see that a 1 byte long command is surrounded by a Preamble, a Start Delimiter and a two byte long checksum, i.e. about 80% of the data transmitted in the data frame are not payload. The same also applies to the Fail command. This shows that there exists an enormous potential for recognizing a much greater number of transponders per time unit, if it were possible to improve the unfavorable ratio between payload and total data in a data frame.

It is an object of the invention to create an RFID device of the type indicated in the first paragraph, an RFID system of the type indicated in the second paragraph and an anti-collision method of the type indicated in the third paragraph, in which the disadvantages mentioned earlier are avoided. To provide a solution for the above-mentioned object, the features as invented have been provided on an RFID device as invented, such that an RFID device as invented can be characterized in the manner mentioned below, namely:

RFID device for non-contact communication with other RFID devices of an RFID system by means of modulated electromagnetic signals, which contain data and/or commands packed in data frames, in which a group of data frames contains synchronization information for synchronization of mutually communicating RFID devices, and another group of data frames does not contain any such synchronization information, with synchronizing means configured to effect synchronization of the RFID device by synchronizing information contained in received data frames and with synchronization status test means configured to detect whether the RFID device runs synchronously with at least one other RFID device of the RFID system, from which it receives data frames, and in the event of not running synchronously to switch on the synchronizing means, in which event the synchronizing means can preferably be switched off automatically after the synchronization has been effected.

To provide a solution for the above-mentioned object, the features as invented have been provided on an RFID system as invented, such that an RFID system as invented can be characterized in the manner mentioned below, namely:

RFID system, comprising at least one reading device and at least one transponder, which are configured for non-contact communication by means of modulated electromagnetic signals, which contain data and/or commands packed in data frames, where the reading device is configured for transmitting a group of data frames, which contain synchronization information for synchronization with the transponder and to transmit another group of data frames which do not contain such synchronization information, where the transponder has synchronizing means which are arranged to effect a synchronization of the RFID device with the help of synchronization information contained in received data frames and has synchronization status test means configured to detect whether the transponder runs synchronously with the reading device and in the event of it not running synchronously to switch on the synchronizing means where the synchronizing means can preferably be switched off automatically on successful synchronization.

To provide a solution to the above-mentioned object, features as invented are provided on an anti-collision method as invented, such that an anti-collision method as invented can be characterized in the manner mentioned below, namely:

Anti-collision method for the determination of a plurality of transponders in an effective area of a reading device, comprising the provision of at least one reading device and a number of transponders, where the reading device communicates without contact with the transponders by means of modulated electromagnetic signals, which contain data and/ or commands packed in data frames, where the reading device broadcasts an Inventory command for determination of transponders present in its effective area, through which command each transponder present in the effective area of the reading device is requested to transmit a response with a unique identification number to the reading device, when the reading device sends the Inventory command in a data frame that contains synchronization information for synchronization with the transponders, in which event the transponders synchronize themselves with the reading device with the help of the synchronization information contained in the received data frame, upon which the reading device transmits a Repeat command in the event there are colliding responses from several transponders, which causes the transponders to send the response once more and upon which the reading device sends a Confirm command to those transponders whose response was received without error, which causes these transponders not to react to Repeat commands, upon which the reading device continues the broadcasting of Confirm commands and Repeat commands until no transponder responds any more within a predefined interval, upon which the reading device sends the Repeat commands and/or Confirm commands in data frames that do not contain any synchronization information.

The features as invented help achieve that it is no longer necessary to send along synchronization information with each transmitted data frame, which makes up a considerable and often dominant portion of the transmitted data in comparison with the payload. Leaving out the synchronization information in at least some of the data frames to be transmitted represents time saving that is extremely relevant. The performance gain achieved thereby can be as much as 20-30% in comparison with known systems. The present invention offers solutions as to how RFID devices should handle the data frames, which they receive and from which they do not know whether they contain synchronization information or not. If an RFID device were to try all the time to synchronize with each received data frame, it would miss out on the first relevant bits of payload in case of data frames without synchronization information and in the process synchronize itself at a completely inappropriate data rate. If the RFID device, on the other hand, were not to regard any received data frame as data frames containing synchronization information and, consequently, never execute synchronization routines, it would soon run asynchronously with the transmitting RFID device. It is, however, possible to ensure the synchronous run between the transmitting and receiving RFID device by means of the measures as invented.

According to the measures claimed in the claim 2 the advantage is derived that the synchronization routine is executed as fast as possible if required, because no data frame is left out that could contain synchronization information.

According to the measures claimed in the claims 3 and 13, the advantage is derived that it can be recognized from data frames received incorrectly whether the RFID device has fallen out of step. It proves to be favorable to set the error limit at a value higher than one, because there are ever so often data frames received with errors due to the collisions in an RFID system with several RFID devices, which however have nothing to do with asynchronous run.

According to the measures claimed in the claims 4 and 14, the advantage derived is that it is established beyond doubt with every data frame received error-free that transmitter and receiver are running synchronously and therefore at that point in time, the synchronizing means are not needed and can thus be switched off.

According to the measures claimed in the claims 5 and 15 the advantage derived is that a transmitting RFID device can trigger a synchronization routine on the receiving RFID device(s) any time, by transmitting a synchronization signal outside the usually transmitted data frames, which is recognized by the receiver as such and points out to it that the next data frame contains synchronization information.

According to the measures claimed in the claims 6 and 16 the advantage derived is that the degree of modulation of electromagnetic signals can be easily assessed by the receiver.

According to the measures claimed in the claims 7 and 17 the advantage derived is that the degree of modulation is so high that it lies above the degrees of modulation usually used for data transmission and, therefore, cannot be confused with data signals. It can prove useful for easier detection on the receiver side to switch off electromagnetic field completely for a brief period, which corresponds to a degree of modulation of 100%. It must, however, be borne in mind that the electromagnetic field in passive RFID devices also serves as energy supply for these RFID devices. These do have a small energy storage (capacitor, coil), which is however dissipated soon, so the selected duration of switch-off of the electromagnetic field must be suitably short.

According to the measures claimed in the claims 8 and 18 the advantage derived is that of an extremely securely working construction of the RFID devices.

According to the measures claimed in the claims 9 and 19 the advantage derived is that in parallel routines all the received data frames are handled so well as if they contained synchronization information and also so well handled as if they contained no synchronization information. As only one of these methods produces a suitable result and always those synchronizing means are switched to that produce a sensible result, this ensures that each data frame is processed correctly and thus no data frame is lost.

According to the measures claimed in the claim 10 the advantage derived is that transponders, as well as reading devices of the RFID system as invented can synchronize with a remote station. This is especially useful if certain transponders can become active on their own and transmit data frames to reading devices so that the reading devices have to synchronize with the transmitting transponders.

According to the measures claimed in the claim 12 the advantage derived is that inventorization, which is the establishing routine of a reading device as to which transponders are present in its effective area, runs at a higher performance and speed.

According to the measures claimed in the claims 21 to 26 the advantage derived is that the anti-collision method is implemented with higher speed and reliability.

These and other aspects of the invention are apparent from and will be elucidated, by way of non-limitative examples, with reference to the embodiment(s) described hereinafter.

The invention will be elucidated below by way of non-limitative Figures referring to the embodiments.

Figure 3:
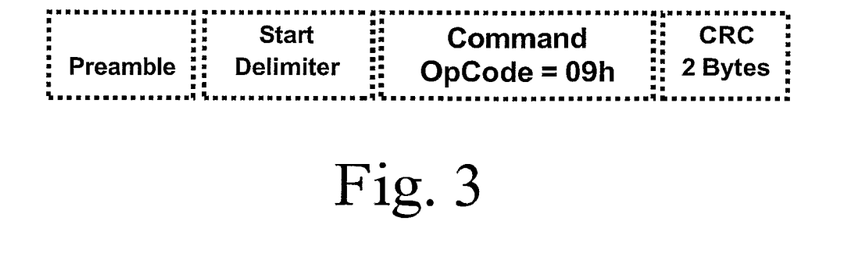
FIG. 3 shows the construction of a data frame in conformity with the ISO 18000-6 standard for what is called a Success command, which is used in the execution of an anti-collision method.

The FIGS. 1 to 3 have been elucidated already in the introduction to the description.

Figure 4:
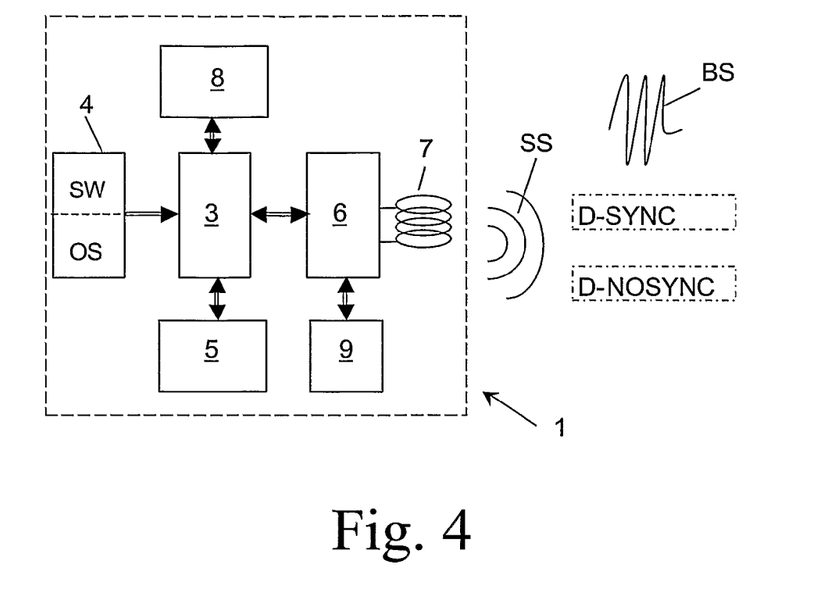
FIG. 4 shows an RFID device as invented in the form of a reading device in a block circuit diagram.

FIG. 4 shows a block circuit diagram of an RFID device configured as reading device 1 as part of an RFID system (Radio Frequency Identification System), which comprises at least one reading device and at least one transponder 2 which is described further below with the help of the FIG. 5. Reading device and transponder communicate in the RFID system without contact by means of modulated electromagnetic signals, if the transponder 2 is within the effective area of the reading device 1. The reading device 1 comprises processing means 3, such as a microprocessor or microcontroller, which communicate with program storage means 4 via a data bus, in which storage means an operating system OS is stored for execution of basic operations of the processing means and in which storage means program code SW is stored for execution in the processing means. The program storage means 4 can be a semi-conductor storage device, such as PROM, EPROM, EEPROM etc. It should be mentioned that the processing means and the program storage means can even be configured as an ASIC, PAL or similar. Similarly, the program code SW to be executed can be unified with the operating system as one program, which is restricted to rudimentary functions for reading in the data from the data carrier 2 and for processing the read-in data. Furthermore, the processing means 3 in this example of embodiment are in communication link with volatile data storage 5, for example a RAM. The processing means 3 work with input/output devices 8 in the execution of the program code SW, which input/output devices 8 can be configured differently depending on the configuration of the reading device 1. Only for the sake of illustrating, let it be supposed that the input/output means 8 are also configured as interface for connecting to a control computer.

In order that the processing means 3 can communicate without contact with one or several transponders, the reading device 1 has communications means 6 and an antenna 7 connected to it for transmitting electromagnetic signals SS. With the help of these electromagnetic signals SS transponder 2 can also be supplied with electrical energy, for example if the transponder 2 is a passive transponder conforming to the ISO 18000-6 standard or the ISO/IEC-14443 standard. In the former case, the communication means 6 transmit a carrier signal with a frequency of 860-930 MHz over the antenna 7 and in the latter case a carrier signal with a frequency of 13.56 MHz, which bears pulse width modulated information. Even lower frequencies can be used to achieve greater ranges, for example at about 135 kHz. It should, however, be mentioned that the frequency of the wirelessly transmitted electromagnetic signals is not specifically restricted, but generally comprises signals between a frequency above about 10 kHz up to in the GHz range.

Figure 6:
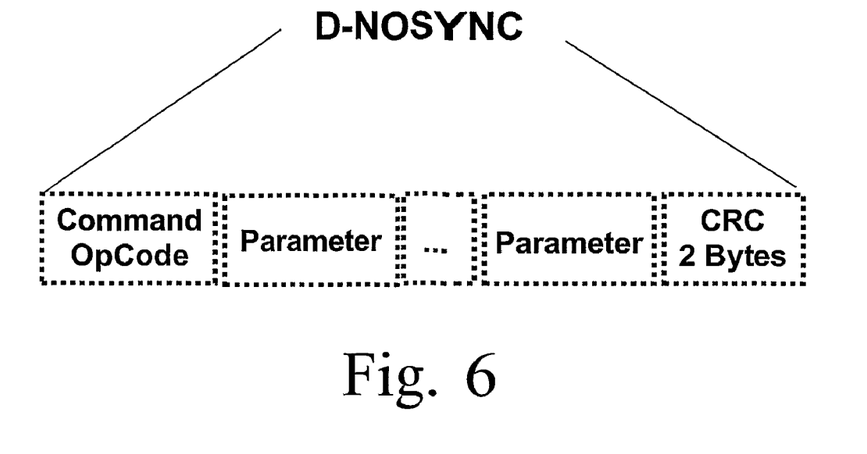
FIG. 6 shows a data frame without synchronization information for use in an RFID system as invented.

The reading device 1 communicates with the transponders by sending data frames in which commands and/or data are packed. The reading device 1 can then send two different groups of data frames, viz. on one hand a group of data frames containing synchronization information for synchronization with the transponder, as the data frame D-SYNC shown in FIG. 1 and on the other, a group of data frames containing no synchronization information as the data frame D-NOSYNC shown in FIG. 6 which has the following components:

i) Command OpCode: The number of the actual command, one byte long.

ii) Parameter: The command defined by the Command Opcode can contain one or several parameters, which are similarly transmitted.

iii) CRC: A two-byte long checksum makes possible the checking at the receiving device whether the received data frame was received free of error.

One can see from the comparison of the data frames D-SYNC and D-NOSYNC, that the latter data frame is considerably shorter and consists almost only of payload.

Figure 5:
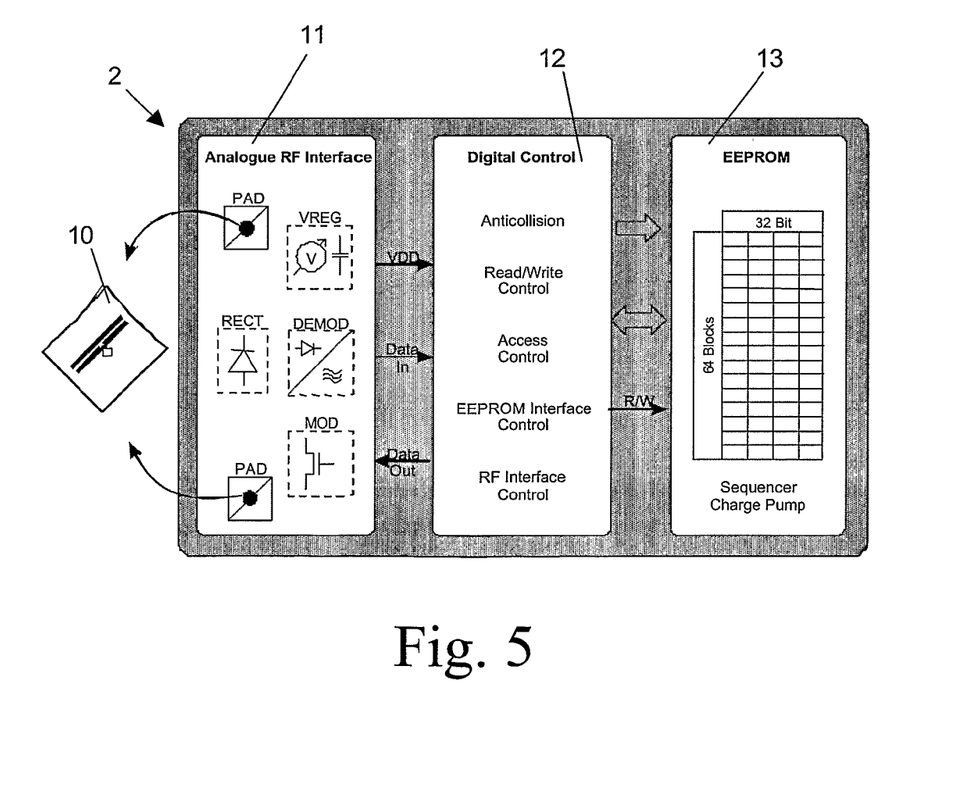
FIG. 5 shows an RFID device in the form of a transponder in a block circuit diagram.

FIG. 5 shows a block circuit diagram of a transponder 2, which works with the reading device 1 shown in FIG. 4. The transponder 2 comprises an antenna 10, an analog high-frequency interface 11, a digital control 12 and an EEPROM 13, in which data can be written, which are also retained on switching off the electrical supply. The EEPROM 13 can also contain program code for operating the digital control 12 as well as a unique identification number of the transponder 2. The antenna 10 comprises a coil with one or more windings, the conductor ends of which are connected to the PADs of the analog high frequency interface 11. The antenna 10 receives the electromagnetic signals SS transmitted by reading device 1 and conveys them to the analog high-frequency interface 11. The analog high-frequency interface 11 comprises a voltage regulator VREG with integrated energy storage to branch off the energy from the received electromagnetic signals SS which energy is required for operating the transponder 2 and make it available as operating voltage VDD of the digital control 12 and the EEPROM 13. Furthermore, the analog high-frequency interface 11 comprises a rectifier RECT and a demodulator DEMOD, to rectify the received electromagnetic signals SS and to demodulate the data frames D-SYNC and D-NOSYNC as well as other data from this modulated signal and forward them to the digital control 12 as a serial data stream (Data in) for processing.

The digital control 12 forms processing means for the received data stream by detecting and processing the commands and/or data contained in the data frames D-SYNC and D-NOSYNC. For this purpose, the digital control 12 has various function blocks such as an anti-collision function block, a write/read control, an access control, an EEPROM interface control for generating R/W signals for appropriate control of the EEPROM 13 as well as a high-frequency interface control for forwarding of data to be transmitted as a raw data stream (Data out) to the analog high-frequency interface 11, which modulates the raw data stream in a modulator MOD and sends the appropriately modulated electromagnetic signals through the antenna 10 to the reading device 1. The raw data stream (Data out) can contain, for example, a unique identification number of the transponder 2 demanded by the reading device 1.

Figure 7:
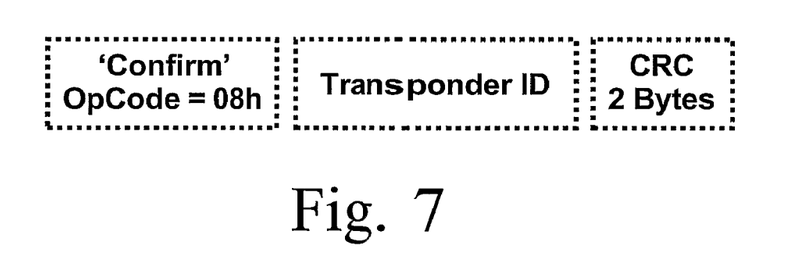
FIG. 7 shows a Confirm command for use in an anti-collision method in an RFID system as invented.
Figure 8:
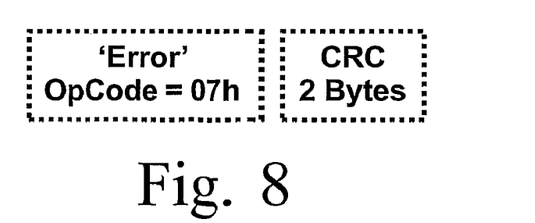
FIG. 8 shows an Error command for use in an anti-collision method in an RFID system as invented.
Figure 9:
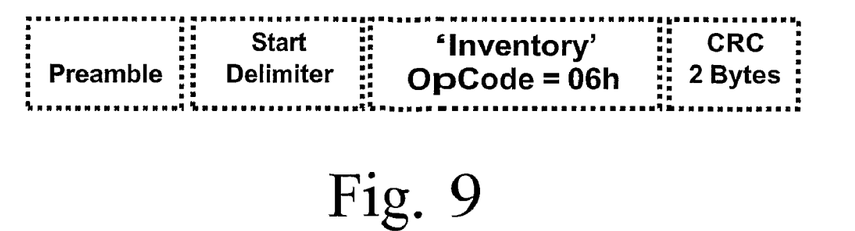
FIG. 9 shows an Inventory command for use in an anti-collision method in an RFID system as invented.

For the reading device 1 and the transponder 2 to be able to communicate with each other successfully, it is necessary that the transponder synchronize with the reading device at relatively short intervals. Unlike the known RFID systems, which provide each data frame with a Preamble and a Start Delimiter, as described earlier (compare data frame D-SYNC in FIG. 1), such that the transponder can execute a synchronization routine for each received data frame at the cost of the data throughput rate by adjusting an oscillator of the demodulator according to the information derived from Preamble and Start Delimiter, only a part of the data frame is to be provided with synchronization information in case of the RFID system as invented, to achieve an increase in the data throughput rate. Thus, for example, the Confirm command shown in FIG. 7 and the Error command shown in FIG. 8, are packed in data frames of the D-NOSYNC type (see FIG. 6). These data frames are accordingly short, because the Error command consists only of three bytes (1 Byte OpCode and 2 Bytes CRC) and the Confirm command has three bytes plus the length of a transponder identification number transmitted along. The Inventory command shown in FIG. 9 is in turn packed in a data frame of the D-SYNC type and therefore also contains synchronization information in the form of a Preamble and a Start Delimiter. The anti-collision method described above with the help of FIG. 2 can be executed considerably faster by using these three commands than with the RFID systems of the state of the art technology. It has been shown that the measures as invented help achieve a performance increase of 20-30%. The run of the anti-collision method with the commands as invented is similar to that described above with the help of FIG. 2, so the attention is drawn to the above description where only the Group Select XX command is to be replaced by the Inventory command, the Fail command by the Error command and the Read-Success command by the Confirm command. Furthermore, another Next time slot command is provided, which is transmitted if no transponder responds within a time slot, where the Next time slot command is transmitted preferably in a D-SYNC data frame with synchronization information, because the non-responding of the transponder could even be attributable to all transponders running asynchronously.

As according to the invention, data frames with synchronization information are transmitted as well as those without synchronization information, measures are required on the transponders 2, which make it possible for the transponder to process both types of data frames correctly.

Figure 10:
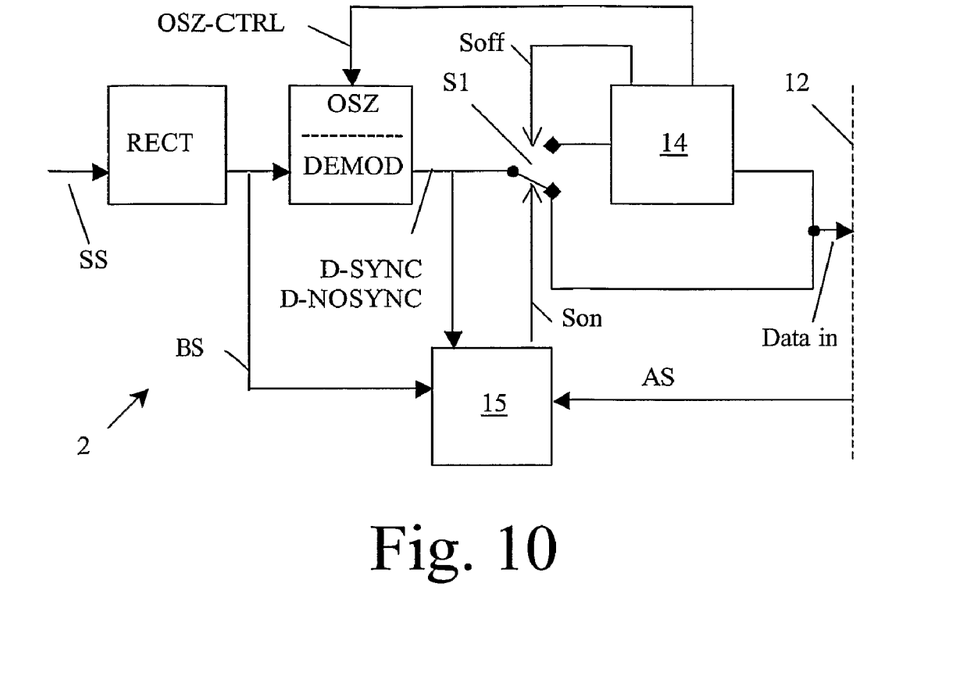
FIG. 10 shows a block circuit diagram of the important parts of a first embodiment of an RFID device as invented in the form of a transponder.

For this purpose, as shown in FIG. 10 in a block circuit diagram, which shows other details of the transponder 2 shown in FIG. 5, synchronizing means 14 are provided in a transponder as invented, which are configured to carry out a synchronization of the RFID device with the help of the synchronization information contained in received D-SYNC data frames, in that the synchronizing means transmit an oscillator control signal OCZ-CTRL to an oscillator OSZ present in the demodulator DEMOD, to set it at a frequency derivable from the synchronization information from received D-SYNC data frames for adaptation to a certain bit rate. Furthermore, synchronization status test means 15 are provided, which detect, whether the transponder runs synchronously with the reading device and in cases of not running synchronously switch on the synchronization means 14, in which event the synchronizing means can be switched off after synchronization is successful. The switching on of the synchronizing means is symbolized in the block circuit diagram by a switch S1, which can be switched on through the control signal Son transmitted by the synchronization status test means 15. It should however be mentioned that the switch S1 is not present physically, but in an actual configuration of the transponder as invented it is replaced by corresponding Firmware routines, which also form the synchronizing means 14 and carry out assessment of the synchronization information in the received data frames by extracting the synchronization information from the data frames and generating the oscillator control signal OCZ-CTRL and simultaneously forwarding the remaining data frames as input data (Data in) to the next digital control 12, or pipe the received data frames as input data (Data in) directly to the next digital control 12.

The routine in the transponder 2 as invented is thus as follows: The electromagnetic signal SS transmitted from the reading device 1 is rectified in the rectifier RECT and forwarded to the demodulator DEMOD, which demodulates from it the data contained in the electromagnetic signal SS, particularly the data frames D-SYNC and D-NOSYNC. The synchronization status test means 15 establish with the help of the demodulated data whether the transponder 2 runs synchronously with the reading device 1. This can take place for example when the data are forwarded as input data (Data in) to the digital control 12 while bypassing the synchronizing means 14, which digital control 12 executes a check of the checksum (CRC) and of the plausibility of the data and in case errors occur or lack of plausibility the synchronizing means 14 transmit an error signal AS to the synchronization status test unit 15, which deduce lack of synchronous run with the reading device 1 and again send the switch-on signal Son to the switch S1, to switch on the synchronizing means 14. The synchronizing means 14 now try to recover synchronization information from each received data frame which they succeed in doing in case of D-SYNC data frames. If the received data frames are, however, of the D-NOSYNC type, the synchronizing means cannot naturally receive any suitable synchronization information. In addition, the received data frame D-NOSYNC becomes unusable for the subsequent digital control 12 due to the tried extraction of synchronization information; this does not however disturb any further because due to the missing synchronization with the reading device the data frame was most probably received with errors anyway. As soon as the synchronization routine was executed successfully, the synchronizing means 14 transmit a switch-off signal Soff to the switch S1, which directs the received data frames past the synchronizing means to the digital control 12. It should be mentioned that alternatively to this configuration, the switch-off signal Soff could also be generated by the digital control 12 or the synchronization status test means 15.

Basically, the transponder 2 does not know whether the received data frames contain synchronization information or not. However, provision is made in a configuration of the RFID system as invented that an RFID device, here the reading device 1 (refer to FIG. 4) before each data frame D-SYNC with synchronization information, also transmits a synchronization start signal BS which is received by the transponder 2 and forwarded to the synchronization status test means 15, as shown in FIG. 10. The synchronization status test means 15 work as synchronization start signal detection means, by detecting the synchronization start signals BS and passing on the control signal Son to the switch S1 on detection of a synchronization start signal BS, to lead the next data frame to the synchronizing means 14, which will be a D-SYNC data frame according to the above definition. Expediently, the synchronization start signal BS differs from all data frame signals in its degree of modulation, so it can be recognized unambiguously by checking the degree of modulation of the synchronization start signal detection means. Preferably, the degree of modulation of the synchronization start signal BS is very high i.e. above 50% up to full, brief field switch-off, which corresponds to a 100% degree of modulation.

Figure 11:
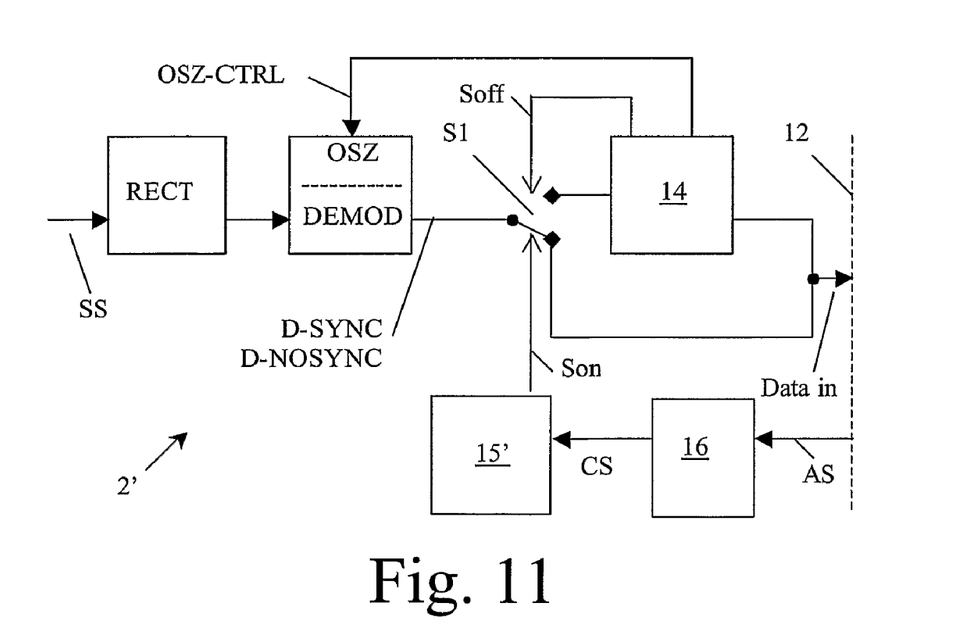
FIG. 11 shows a block circuit diagram of the important parts of a second embodiment of an RFID device as invented in the form of a transponder.

FIG. 11 shows another embodiment of a transponder 2' as invented, in section. This differs from the embodiment of FIG. 10 mainly in that a data frame error counter 16 is connected between the synchronization status test means 15' and the digital control 12, which error counter receives the error signals AS and counts the number of erroneously received data frames, as well as transmits an activation signal CS to the synchronization status test means 15' when a specified error limit value is exceeded, which switch on the synchronizing means 14 by sending the switch signal Son to the switch S1. Even in this case the synchronization status test means 15' or the digital control 12 can be configured for switching off the synchronizing means 14 on receiving a data frame correctly.

Figure 12:
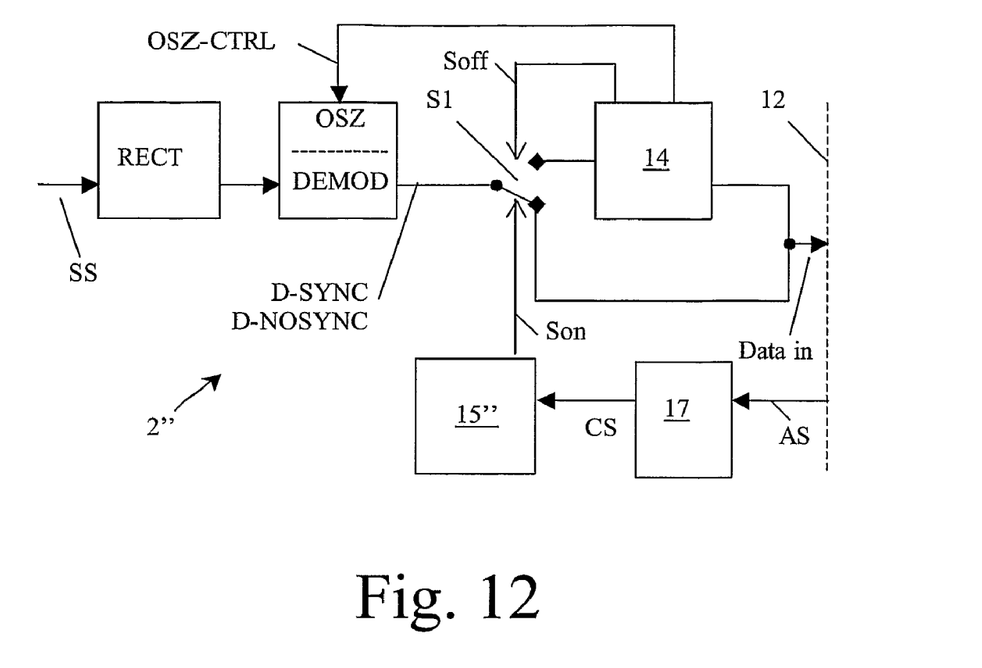
FIG. 12 shows a block circuit diagram of the important parts of a third embodiment of an RFID device as invented in the form of a transponder.

FIG. 12 again shows another embodiment of a transponder 2'' as invented, in section. This differs from the embodiment of FIG. 10 mainly because a Watchdog timer 17 is connected between the synchronization status test means 15'' and the digital control 12, which timer transmits an activation signal CS to the synchronization status test means 15'' after a predefined time interval has elapsed in which no or no correct data frame could be received, which test means thereupon switch on the synchronizing means 14 by transmitting the switch signal Son to the switch S1. In this embodiment, the error signal AS is configured by the digital control such that it is transmitted at each correctly received data frame, in order to reset the Watchdog timer 17. This means that after the synchronizing unit 14 has been switched on the Watchdog timer 17 is reset automatically as soon as the synchronization routine was successful and the first correct data frame was received by the digital control 12.

Figure 13:
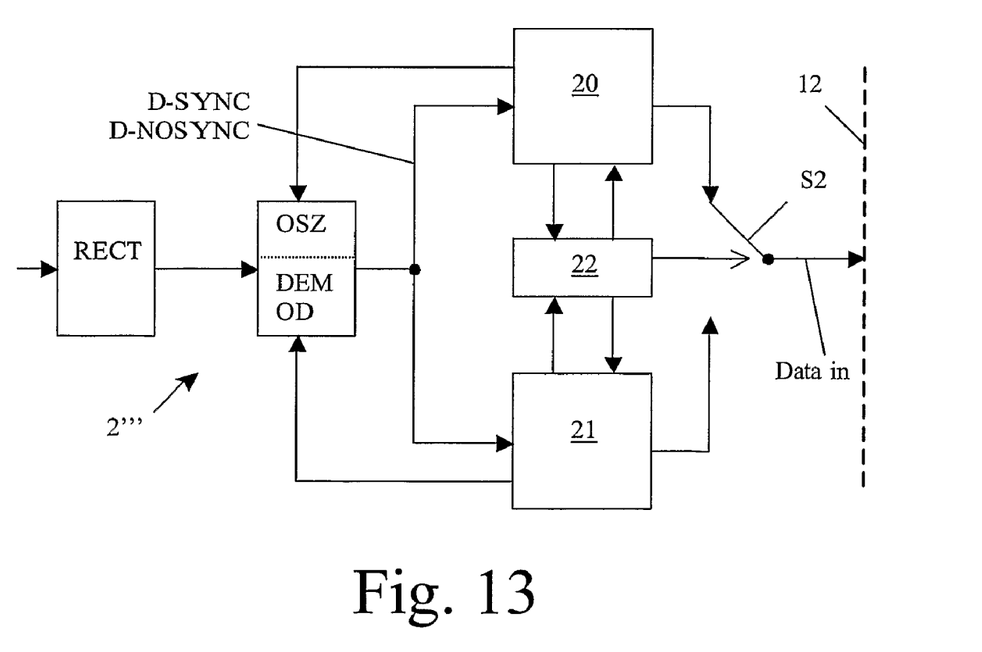
FIG. 13 shows a block circuit diagram of the important parts of a fourth embodiment of an RFID device as invented in the form of a transponder.

FIG. 13 shows yet another embodiment of a transponder 2''' as invented. Two synchronizing means 20, 21 are provided in this configuration, which can be operated alternately such that one of the synchronizing means (here 21) handles each received data frame as a data frame D-SYNC containing synchronization information and tries to read out its synchronization information for executing a synchronization routine, while the other synchronizing means (here 20) handles each received data frame as a data frame D-NOSYNC without synchronization information and transfers it as input data (Data in) to following data frame processing means in the form of the digital control 12. As soon as the synchronization routine of the one synchronizing means 20 is successful, they report this to the synchronization status test means 22 which thereupon switch over the operation of the two synchronizing means 20, 21 (symbolized by control lines from the synchronization status test means 22 to the synchronizing means 20, 21 as well as by the switch S2).

The invention claimed is:

1. An RFID device for non-contact communication with a reading device via modulated electromagnetic signals that contain at least one of data and commands packed in data frames, the RFID device comprising:
    synchronizing circuit configured to effect synchronization of the RFID device with the reading device responsive to receipt of a data frame containing synchronizing information from the reading device;
    a data control unit configured and arranged to, in response to receipt by the reading device of a data frame containing synchronizing information, receive data frames with the synchronization information removed by the synchronizing circuit and thereby not both receive and use at the data control unit the synchronization information for synchronization and configured and arranged to receive data frames from a command not containing synchronization information for effecting synchronization of the RFID device received by the reading device;
    synchronization status test circuit configured to detect whether the RFID device runs synchronously with the reading device and to switch on the synchronizing circuit responsive to detecting that the RFID device is not synchronized with the reading device,
    wherein the RFID device is configured to receive multiple different types of commands as groups of data frames from the reading device, and wherein at least one of the received commands does not contain synchronizing information for effecting synchronization of the RFID device with the reading device.

2. An RFID-device as claimed in claim 1, in which the synchronizing circuit is configured in such a manner that every received data frame is to be treated as a data frame containing synchronization information.

3. An RFID device as claimed in claim 1, in which the synchronization status test circuit cooperates with a data frame error counter to count the number of erroneously received data frames and in the event of exceeding of a specified error limit, to switch on the synchronizing circuit.

4. An RFID device as claimed in claim 3, in which the synchronization status test circuit is configured to switch off the synchronizing circuit in the event of a correctly received data frame.

5. An RFID device as claimed in claim 1, in which the synchronization status test circuit is configured for detection of synchronization start signals in the received electromagnetic signals which synchronization start signals are transmitted outside the data frame, where the synchronization status test circuit switches on the synchronizing circuit on detection of a synchronization start signal.

6. An RFID-device as claimed in claim 5, in which the synchronization status test circuit is configured to detect a degree of modulation of the received electromagnetic signals and to recognize as a synchronization start signal a received electromagnetic signal whose modulation factor lies in a specified range.

7. An RFID device as claimed in claim 6, in which the synchronization status test circuit is configured to recognize as a synchronization start signal a received electromagnetic signal whose modulation factor is over 50% up to complete field disconnection.

8. An RFID-device as claimed in claim 1, in which the synchronization status test circuit cooperates with a Watchdog-Timer to switch on the synchronizing circuit after the lapsing of a specified interval, during which no correct data frame could be received.

9. An RFID device for non-contact communication with a reading device via modulated electromagnetic signals that contain at least one of data and commands packed in data frames, the RFID device comprising:
    synchronizing circuit configured to effect synchronization of the RFID device with the reading device responsive to receipt of a data frame containing synchronizing information from the reading device;
    a data control unit configured and arranged to, in response to receipt by the reading device of a data frame containing synchronizing information, receive data frames with the synchronization information removed by the synchronizing circuit and thereby not both receive and use at the data control unit the synchronization information for synchronization and configured and arranged to receive data frames from a command not containing synchronization information for effecting synchronization of the RFID device received by the reading device;
    synchronization status test circuit configured to detect whether the RFID device runs synchronously with the reading device and to switch on the synchronizing circuit responsive to detecting that the RFID device is not synchronized with the reading device, the synchronization status test circuit including two synchronizing circuits which can be run alternately in such a manner that one of the synchronizing circuits processes every received data frame as a data frame containing synchronization information and tries to read the synchronization information for executing a synchronization routine, while the other synchronizing circuit forwards every received data frame to the data control unit where the operation of the two synchronization circuits is switched over if a synchronization routine of one of the synchronization circuits is successful;

wherein the RFID device is configured to receive multiple different types of commands as groups of data frames from the reading device, and wherein at least one of the received commands does not contain synchronizing information for effecting synchronization of the RFID device with the reading device.

10. An RFID-device as claimed in claim 1, in which the RFID-device is configured as a transponder.

11. An RFID system, comprising:

at least one reading device and at least one transponder, the reading device and the transponder configured for non-contact communication via modulated electromagnetic signals that contain at least one of data and commands packed in data frames, the reading device configured for transmitting multiple different types of commands as groups of data frames to the transponder, at least one of the commands containing synchronization information for effecting synchronization of the reading device with the transponder and at least one of the commands not containing the synchronization information; and the transponder including synchronization circuit configured to effect synchronization of the transponder with the reading device responsive to receipt of a command that contains the synchronization information, and including synchronization status test circuit configured for detecting whether the transponder runs synchronously with the reading device and to switch on the synchronization circuit responsive to detecting that the transponder is not synchronized with the reading device; and a data control unit configured and arranged to, in response to receipt by the reading device of a data frame containing synchronizing information, receive data frames with the synchronization information removed by the synchronizing circuit, and thereby not both receive and use at the data control unit the synchronization information for synchronization and configured and arranged to receive data frames from a command not containing synchronization information for effecting synchronization of the transponders received by the reading device.

12. An RFID system as claimed in claim 11, in which the reading device is configured to transmit inventory commands, responsive to the inventory commands, each transponder present in an effective area of the reading device is configured to report to the reading device.

13. An RFID system as claimed in claim 11, in which the synchronization status test circuit cooperates with a data frame error counter to count the number of erroneously received data frames and in the event of exceeding of a specified error limit, to switch on the synchronizing circuit.

14. An RFID system as claimed in claim 13, in which the synchronization status test circuit is configured to switch off the synchronizing circuit in the event of a correctly received data frame.

15. An RFID system as claimed in claim 11, in which the reading device is configured to send synchronization start signals as electromagnetic signals before data frames containing synchronization information, and the synchronization status test circuit of the transponder are configured for detecting the synchronization start signals in the received electromagnetic signals and to switch on the synchronization circuit on detection of a synchronization start signal.

16. An RFID system as claimed in claim 15, in which the reading device is configured for sending an electromagnetic signal as a synchronization start signal, the synchronization start signal having a modulation factor in a specified range and the synchronization status test circuit are configured to detect synchronization start signals from the modulation factor of the received electromagnetic signals.

17. An RFID system as claimed in claim 16, in which the reading device is configured for sending an electromagnetic signal as a synchronization start signal with a modulation factor of over 50% up to complete field disconnection.

18. An RFID system as claimed in claim 11, in which the synchronization status test circuit cooperates with a Watchdog-Timer to switch on the synchronizing circuit after the lapsing of a specified interval, during which no correct data frame could be received.

19. An RFID system, comprising:

at least one reading device and at least one transponder, the reading device and the transponder configured for non-contact communication via modulated electromagnetic signals that contain at least one of data and commands packed in data frames, the reading device configured for transmitting multiple different types of commands as groups of data frames to the transponder, at least one of the commands containing synchronization information for effecting synchronization of the reading device with the transponder and at least one of the commands not containing the synchronization information; and a data control unit configured and arranged to, in response to receipt by the reading device of a data frame containing synchronizing information, receive data frames with the synchronization information removed by the synchronizing circuit, and thereby not both receive and use at the data control unit the synchronization information for synchronization and configured and arranged to receive data frames from a command not containing synchronization information for effecting synchronization of the transponders received by the reading device;

the transponder including synchronization circuit configured to effect synchronization of the transponder with the reading device responsive to receipt of a command that contains the synchronization information, and including synchronization status test circuit configured for detecting whether the transponder runs synchronously with the reading device and to switch on the synchronization circuit responsive to detecting that the transponder is not synchronized with the reading device; and a synchronization status test circuit and two synchronizing circuits which can be run alternately in such a manner that one of the synchronizing circuit processes every received data frame as a data frame containing synchronization information and tries to read their synchronization information for executing a synchronization routine, while the other synchronizing circuit forwards every received data frame to the data control unit where the operations of the two synchronization units are switched over if a synchronization routine of one synchronization circuit is successful.

20. An anti-collision method for determining a number of transponders in an effective area of a reading device, the reading device communicating with the transponders without contact via modulated electromagnetic signals that contain at least one of data and commands packed in data frames, the method comprising:

transmitting, by the reading device, an inventory command as a group of data frames for determination of the transponders present in the effective area, the inventory command containing synchronization information for synchronization of the reading device with the transponders;

transmitting, by each of the transponders present in the effective area and responsive to the inventory command, a response with a unique identification number that identifies the transponder to the reading device;

transmitting, by the reading device, a repeat command as a group of data frames responsive to the reading device receiving mutually colliding responses from several of the transponders, the repeat command causing the transponders to retransmit their responses and the repeat command not containing the synchronization information;

transmitting, by the reading device, a confirm command to each of the transponders whose response was received without errors, the confirm command causing each of the transponders whose response was received without errors not to respond to the repeat command and the confirm command not containing the synchronization information; and repeating, by the reading device, transmission of confirm commands and repeat commands until none of the transponders respond within a specified time interval; and receiving by a data control unit configured and arranged to, in response to receipt by the reading device of a data frame containing synchronizing information, receive data frames with the synchronization information removed by the synchronizing circuit, and thereby not both receive and use at the data control unit the synchronization information for synchronization and configured and arranged to receive data frames from a command not containing synchronization information for effecting synchronization of the transponders received by the reading device.

21. An anti-collision method as claimed in claim 20, in which the transponders respond to the reading device at randomly selected delays.

22. An anti-collision method as claimed in claim 21, in which the delay selectable by the transponder lies in a round, which has a number of time slots which are pre-defined and possibly variable by the reading device with durations, which are defined and possibly variable by the reading device.

23. An anti-collision method as claimed in claim 22, in which the reading device transmits nothing more than a Confirm command or a Repeat command per time slot, where a time slot is optionally early scheduled by these commands.

24. An anti-collision method as claimed in claim 22, in which the Repeat command triggers the transponders to start a new round.

25. An anti-collision method as claimed in claim 22, in which the reading device sends a Next Time Slot command, if no transponder responds within a time slot, where the Next-Time slot command is preferably sent in a data frame with synchronization information.

26. An anti-collision method as claimed in claim 22, in which the anti-collision method is scheduled if no transponder responds within a round.

\* \* \* \* \*